(12) United States Patent
Asai (10) Patent No.: US 6,394,237 B1
(45) Date of Patent: May 28, 2002

(54) AUTOMATIC SHOE CLEARANCE ADJUSTMENT DEVICE FOR A DRUM BRAKE

(75) Inventor: Seiji Asai, Okazaki (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/471,478

(22) Filed: Dec. 23, 1999

(30) Foreign Application Priority Data

Dec. 25, 1998 (JP) .......................... 10-370045

(51) Int. Cl.[7] .......................... F16D 51/24; F16D 65/56
(52) U.S. Cl. .................. 188/79.51; 188/79.54; 188/325; 188/328; 188/196 BA; 188/106 F
(58) Field of Search .................. 188/79.54, 79.51, 188/79.55, 79.56, 79.63, 196 BA, 106 A, 106 F, 79.64, 79.61, 79.62, 325, 331, 78, 328

(56) References Cited

U.S. PATENT DOCUMENTS 6,003,645 A * 12/1999 Asai et al. ............... 188/79.54
6,082,505 A * 7/2000 Asai et al. ............... 188/79.54
6,223,869 B1 * 5/2001 Asai et al. .................. 188/325

FOREIGN PATENT DOCUMENTS

| EP | 1013960 | * | 6/2000 |
| JP | 200192998 | * | 7/2000 |

* cited by examiner

*Primary Examiner*—Douglas C. Butler
(74) *Attorney, Agent, or Firm*—Liniak, Berenato, Longacre & White (57) ABSTRACT

It is an object of this invention to provide an automatic shoe clearance adjustment device for a drum brake mechanism designed to improve its durability by eliminating a gap, which is caused due to the manufacturing tolerances between the operating end surface of a brake shoe and the extended portion of an adjustment lever. To that end, a long hole (81) is formed to extend horizontally in the actuating direction of a service brake actuator (50); and the adjustment lever (80) is pivotally supported via a pin (14) with a capacity of making a rotation relative to the brake shoe (20) and a capacity of making a relative slide in approximately the same direction in which the service brake actuator (50) operates.

27 Claims, 12 Drawing Sheets

AUTOMATIC SHOE CLEARANCE ADJUSTMENT DEVICE FOR A DRUM BRAKE

BACKGROUND OF INVENTION

This invention relates to an automatic shoe clearance adjustment device for a drum brake equipped with an over-adjustment prevention mechanism for a clearance between a brake drum and a brake shoe.

This type of automatic shoe clearance adjustment device is disclosed in the Japanese Patent Publication Number H2-15737. This device is characterized in that an adjustment lever is pivotally mounted on one brake shoe; an extended portion is integrally formed as an extended end of the adjustment lever; an end of the extended portion is arranged to be located between an end part of a piston of a wheel cylinder and an end part of a shoe web of the brake shoe; when an actuating force of the piston reaches a predetermined value, the adjustment lever rotation is restricted, upon a lining of the brake shoe contacting the brake drum, to cease the automatic shoe clearance adjustment.

In this device, because of an uneven manufacturing tolerance of the brake shoe and the adjustment lever, there needs to be a gap between the end of the shoe web and the end of the extended portion of the adjustment lever. This gap can cause a deformation and breakage at the extended portion when in a high pressure braking application. In addition, since braking is a very frequent action, the pivot section of the adjustment lever becomes worn out which may inhibit the adjustment lever rotation.

SUMMARY AND OBJECTIVE OF THIS INVENTION

This invention was made to mainly improve the above-mentioned points, and to that end, it is an object of this invention to provide an automatic shoe clearance adjustment device for a drum brake designed to improve its durability by eliminating the gap resulting from manufacturing tolerances.

It is another aspect of this invention to provide an automatic shoe clearance adjustment device for a drum brake which ensures a long-term reliable shoe clearance.

This invention is an automatic shoe clearance adjustment device for a drum brake, comprising: a pair of brake shoes slidably mounted on a back plate; an extendible strut restricting the initial position of the pair of brake shoes; an adjustment lever pivotally supported at one of the brake shoes, the adjustment lever being rotatable in response to an excessive opening of the brake shoes upon operation of a service brake actuator and the adjustment lever having an extended portion integrally formed as an extended end thereof, the extended portion being arranged between the abutment surfaces at the actuating force transmitting section through which the actuating force of the service brake actuator is transmitted to the one of the brake shoes, and the adjustment lever being adapted to stop rotating when the actuating force of the service brake actuator reaches a predetermined value; wherein the adjustment lever is pivotally supported with a capacity of making a rotation relative to the one of the brake shoes and a capacity of making a relative slide in approximately the same direction in which the service brake actuator operates.

This invention still is an automatic shoe clearance adjustment device as claimed above, wherein: a projection is formed either on the adjustment lever or on the one of the brake shoes; and the projection is pivotally supported at a long hole formed either on the other one of the adjustment lever or the one of the brake shoes on which the projection is not formed.

This invention still further is an automatic shoe clearance adjustment device as claimed above, wherein the projection is a protuberance integrally formed with the adjustment lever or the one of the brake shoes by deep drawing by pressing.

This invention still further is an automatic shoe clearance adjustment device for a drum brake, comprising: a single brake shoe slidably mounted on a back plate; an extendible strut restricting the initial position of the brake shoe; a link engaging, with a capacity of depressing, a central region of the brake shoe; and adjustment lever pivotally supported at the link, the adjustment lever being rotatable in response to an excessive opening of the link upon operation of a service brake actuator and the adjustment lever having an extended portion integrally formed as an extended end thereof, the extended portion being arranged between the abutment surfaces at the actuating force transmitting section through which the actuating force of the service brake actuator is transmitted to the link; and the adjustment lever being adapted to stop rotating when the actuating force of the service brake actuator reaches a predetermined value; wherein the adjustment lever is pivotally supported with a capacity of making a rotation relative to the link and a capacity of making a relative slide in approximately the same direction in which the service brake actuator operates.

This invention still further is an automatic shoe clearance adjustment device as claimed above, wherein a projection is formed either on the adjustment lever or on the link and the projection is pivotally supported at a long hole formed either on the adjustment lever or said link on which the projection is not formed.

This invention still further is an automatic shoe clearance adjustment device as claimed above, wherein the projection is a protuberance integrally formed with the adjustment lever or the link by deep drawing by pressing.

This invention still further is an automatic shoe clearance adjustment device as claimed above, wherein both abutment surfaces of the extended portion of the adjustment lever and the brake shoe or the link are formed in a circular shape and a radius of curvature of said abutment surface of said adjustment lever is set to be larger than that of said abutment surface of the brake shoe or said link.

This invention yet further is an automatic shoe clearance adjustment device as claimed above, wherein
 an end portion of the extended portion of adjustment lever is bent outward, and the bent portion is arranged to face the peripheral surface of a service brake actuator piston (151,51) at the back plate side.

BRIEF DESCRIPTION OF THE DRAWINGS

The above and other objects and the attendant advantages of the present invention will become readily apparent by reference to the following detailed description of embodiments of this invention when considered in conjunction with the accompanying drawings wherein.

DETAILED DESCRIPTION OF THIS INVENTION

Embodiment 1

Figure 2:
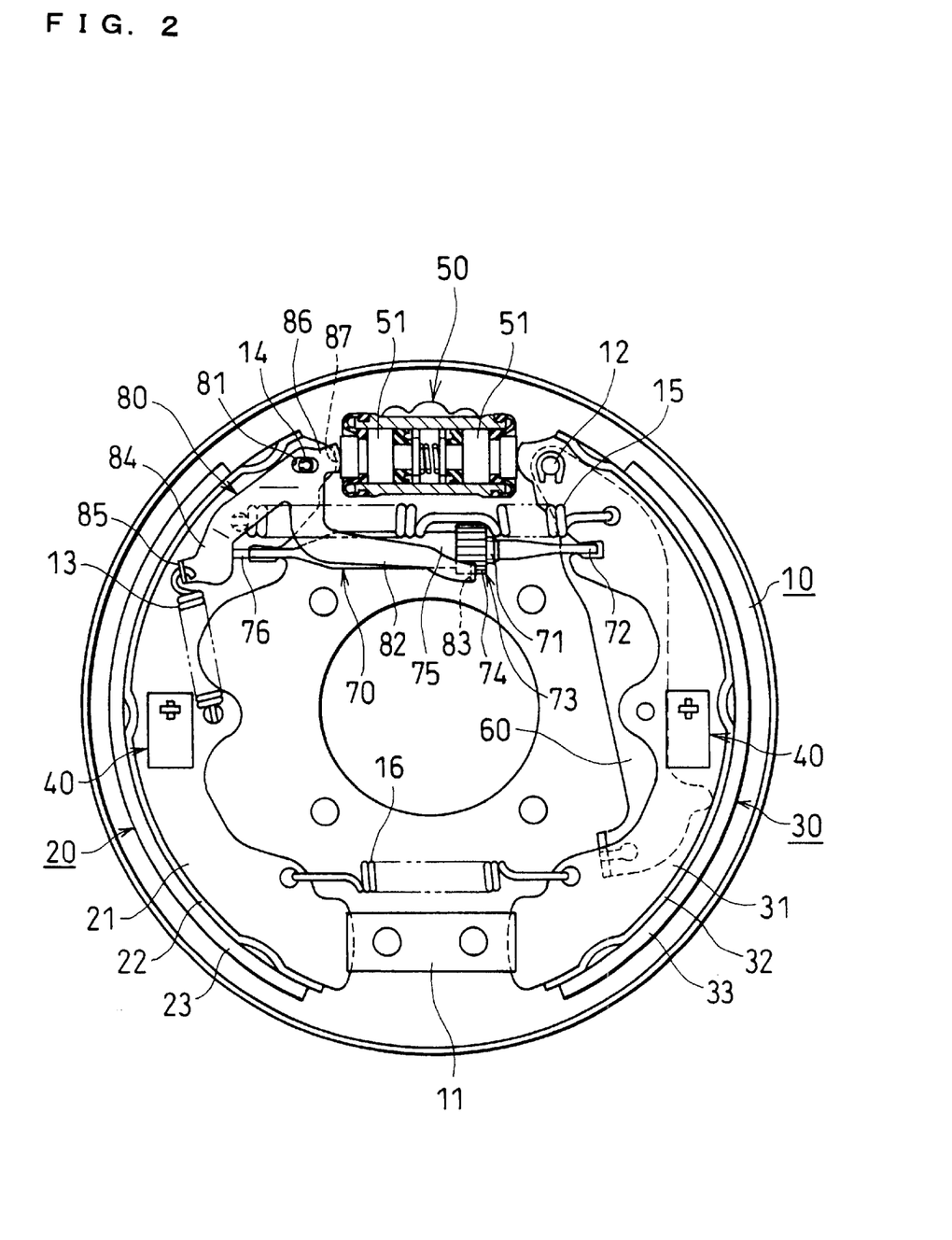
FIG. 2 is a plan view of the drum brake device.

FIG. 2 illustrates an example of a leading-trailing type (LT type) drum brake equipped with an automatic shoe clearance adjustment device. A back plate 10 is fixed on an immovable part of a vehicle axle with bolts. A pair of first and second brake shoes 20, 30 are slidably supported on the back plate 10 by a commonly known shoe hold device 40, 40.

Each of the brake shoes 20, 30, has rims 22, 32 fixed on the shoe webs 21, 31, and linings 23, 33 fixed on the peripheral surface of the rims 22, 23. Each first end of the brake shoes 20, 30 (upper ends in the figure) engages pistons 51, 51 of a wheel cylinder 50, i.e. a service brake actuator, fixed on the back plate 10. Each second end (lower ends in the figure) of the brake shoes 20, 30 is supported by an anchor 11 fixed on the back plate 10.

A base end of a brake lever 60 superimposed under the shoe web 31 of the second brake shoe 30 (the brake shoe at the right side in the FIG. 2) is rotatably supported with a pin 12 as the fulcrum. A rotation of the brake lever 60 is mechanically remote controlled by pulling a parking brake cable, not shown in the figure, connected to a free end of the brake lever 60.

An automatic shoe clearance adjustment device comprises a strut 70 with a male-female screw structure between the shoe web 21 of the first brake shoe 20 (the brake shoe at the left side in the FIG. 2) and the brake lever 60, an adjustment lever 80, and an adjustment spring 13.

In FIG. 2, the strut 70, which is extended between the first brake shoe 20 and the brake lever 60, comprises a bolt 71, a nut 73, and a socket 75. The nut 73 with a plural number of small adjustment teeth 74 on its peripheral surface, is screwed on the bolt 71. A notched groove 72 formed on the right side of the bolt 71 non-rotatably engages the brake lever 60, and the left side of the thread stem (not shown in the figure) smoothly fits into a hollow space of the socket 75.

Then, an end surface of the opening of the socket 75 at its right side abuts against the side surface of the nut 73, and a notched groove 76 formed on the left side, non-rotatably engages the shoe web 21 of the first brake shoe 20.

The adjustment lever 80 is pivotally supported with a capacity of making a relative rotation at a pin 14 as the fulcrum planted on the shoe web 21 of the first brake shoe 20.

The adjustment lever 80 comprises a first arm 82, a second arm 84, and a third arm 86. The first arm 82 is extended toward the adjustment teeth 74 of the nut 73, and comprises a feed pawl 83 which is formed by bending the top end of the first arm 82 and engages the adjustment teeth 74.

The second arm 84 is designed to be formed in approximately right angle relative to the first arm 82, and its inner edge abuts against the outer end surface of the notched groove 76 of the socket 75 constituting the strut 70.

The adjustment spring 13 is stretched between a hook 85 formed at the top of the second arm 84 and the first brake shoe 20. A spring force is constantly applied to provide a counterclockwise rotational force to the second arm 84 with the pin 14 as the fulcrum and is constantly applied in the direction to make the feed pawl 83 abut against the adjustment teeth 74 of the nut 73.

Figure 4:
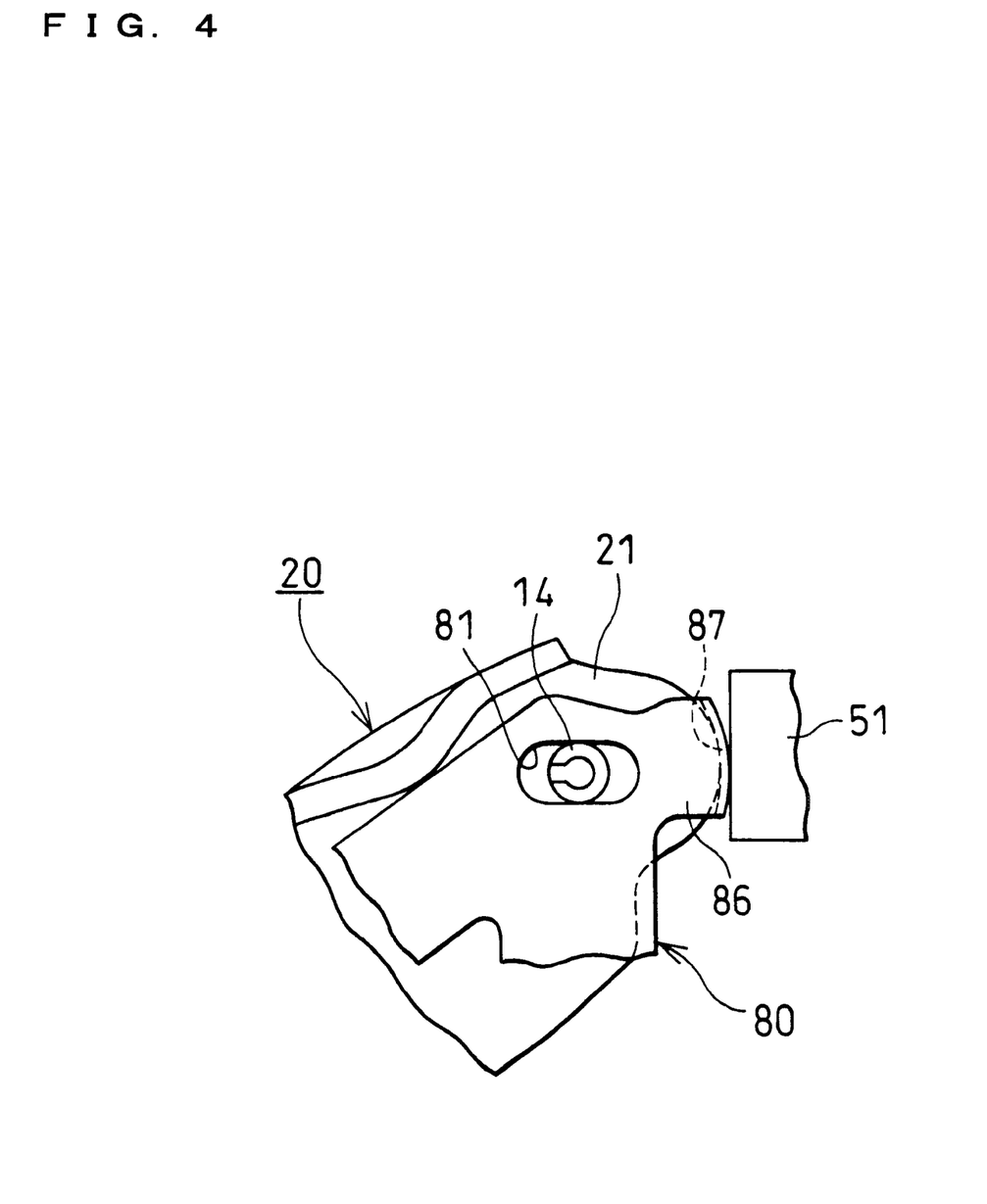
FIG. 4 is a partially enlarged view of the abutment section between the adjustment lever and the brake shoe.

The third arm 86 of the adjustment lever 80, which is formed as an extended portion, is extended toward a piston 51, and the bent portion 87 which is formed by bending at the top end part in right angle is inserted between the end part of the piston 51 and the end part of the shoe web 21 of the brake shoe 20. That is, as shown in an enlarged view of FIG. 4, the bent portion 87 of the adjustment lever 80 and the end surface of the shoe web 21 of the brake shoe 20, are designed to abut against each other along an arc-shape. Thus, it is important that a radial center of curvature of the arc-surface of the shoe web 21 is the center of the pin 14, and that the curvature is designed to be slightly larger at the bent portion 87 side of the adjustment lever 80. Therefore, a smooth rotation of the adjustment lever 80 is obtained.

Shoe return springs 15, 16 are stretched between the shoe webs 21, 31 of the brake shoes 20, 30. What is described above is similar to conventional arts.

Figure 1:
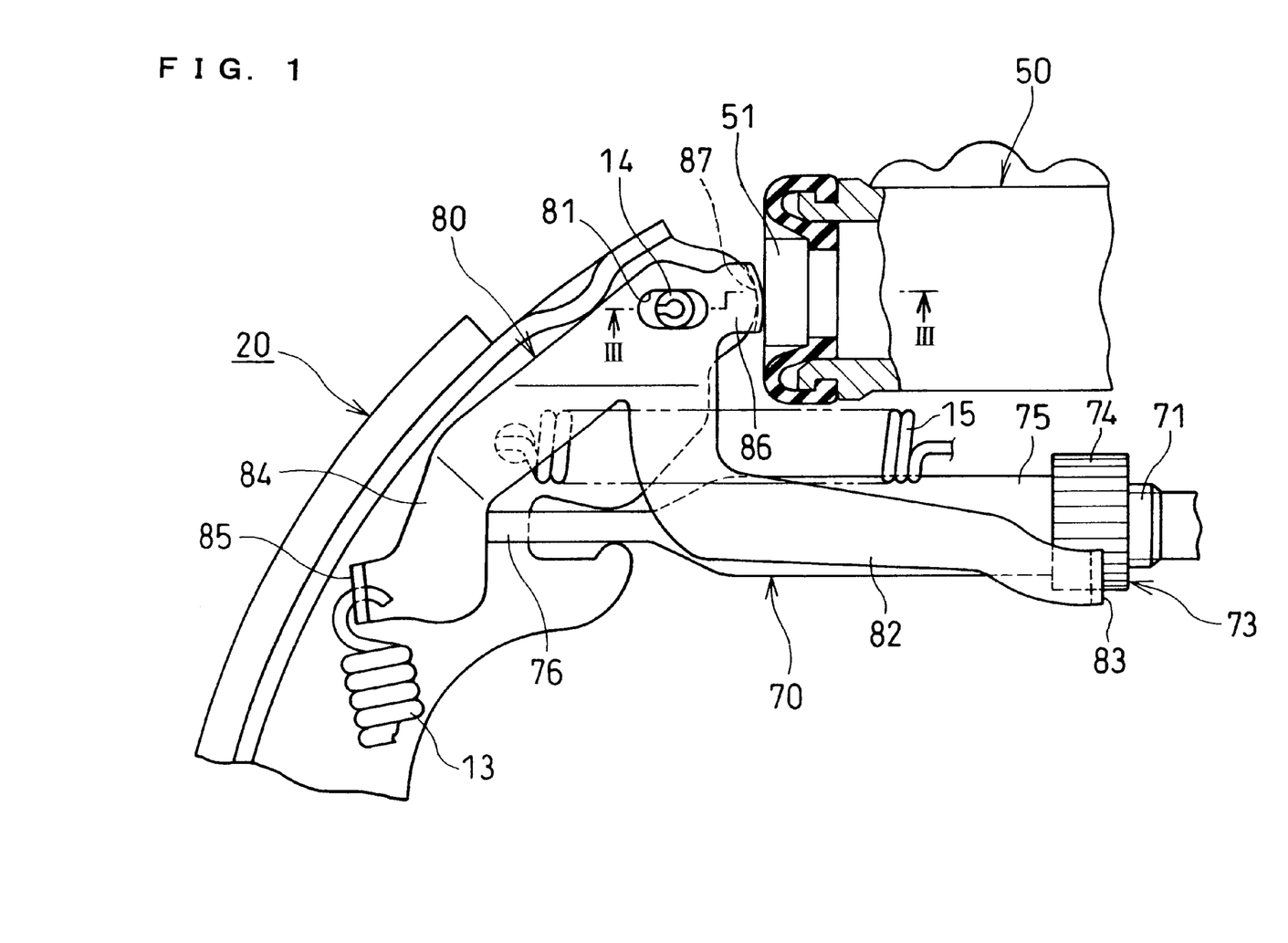
FIG. 1 is an explanation view of the essential part of the automatic shoe clearance adjustment device according to Embodiment 1 of this invention.

In this embodiment, the hole of the adjustment lever 80 pivotally supported by the pin 14 as the fulcrum is formed as a long hole 81 horizontally extended in the direction approximately corresponding to the operational direction of the piston 51; and the adjustment lever 80 is slidable as well as rotatable relative to the first brake shoe 20 in approximately the same direction in which the brake actuator is operating and is supported by means of the pin 14 and the long hole 81.

The pin can be formed on the adjustment lever 80 or on the brake shoe 20 and the long hole can be formed on the respective other part, thereby functioning as a pivot structure so that the adjustment lever 80 is able to make a relative rotation relative to the brake shoe and is slidable in approximately the same direction in which the piston 51 operates.

The purpose of employing the above-explained pivot structure in the pivot section of the brake shoe 20 and the adjustment lever 80 is to constantly maintain the abutment between the end of the shoe web 21 and the bent portion 87 of the third arm 86 without a gap, free from the effects of uneven manufacturing tolerances of the brake shoe 20 and of the adjustment lever 80.

Figure 3:
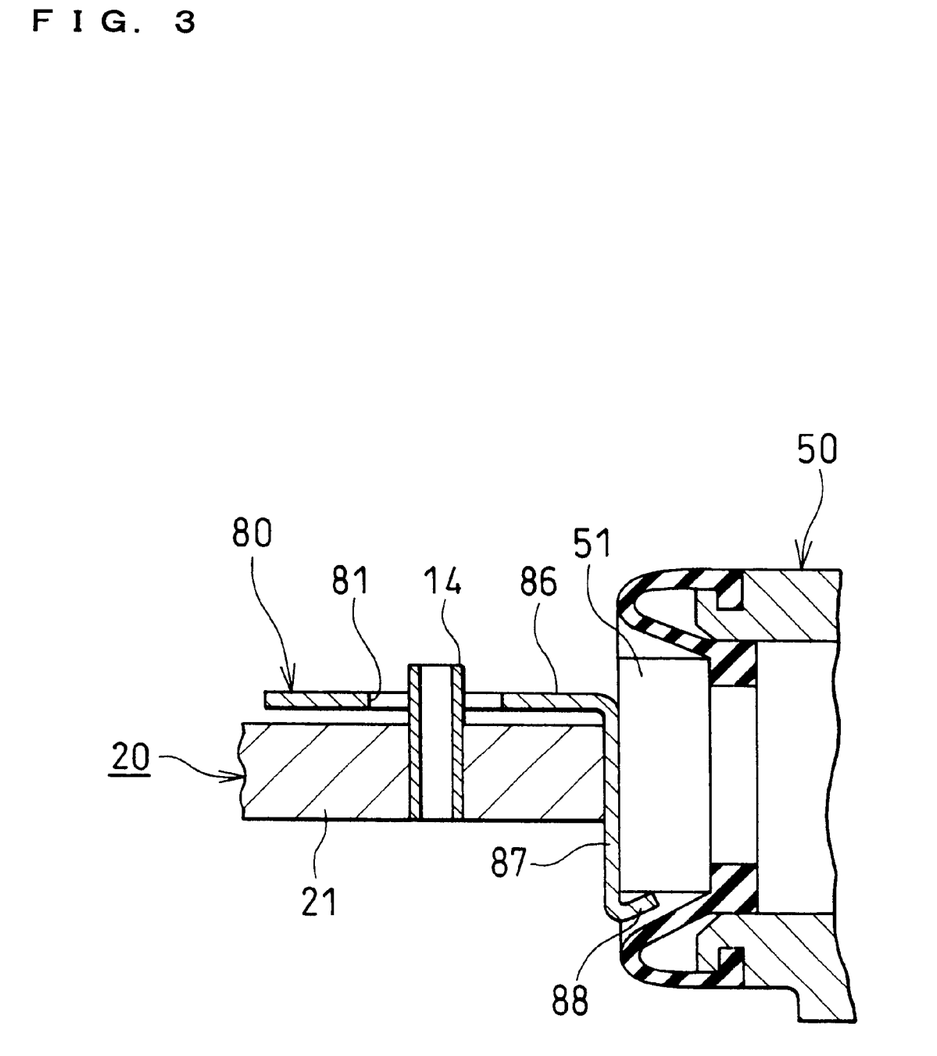
FIG. 3 is a cross-section view of FIG. 1 taken along the line III—III.

In addition, as shown in FIG. 3, this embodiment illustrates a mechanism for preventing the brake shoe 20 from lifting by means of forming a bent hook 88 by bending (folding) the end of the bent portion 87 with an acute angle to face the peripheral surface of the piston 51 at the back plate 10 side (the side on which the brake shoes 20, 30 are supported). However, the bent hook 88 may be omitted.

In FIG. 2, when the service brake pressurizes the wheel cylinder 50, the brake shoes 20, 30 open until they abut against the brake drum not shown in the diagram. At this time, the adjustment lever 80 rotates counterclockwise by the spring force of the adjustment spring 13. This moves the strut 70 to follow the brake shoe 30 and the brake lever 60.

Here, when the linings 23, 33 of the brake shoes 20, 30 become worn out and the opening of both brake shoes 20, 30 increases, the rotation of the feed pawl 83 of the adjustment lever 80 exceeds a pitch between the adjustment teeth 74, thereby rotating the nut 73. As a result, the bolt 71 proceeds from the socket 75 to extend the entire length of the strut 70 approximately for one pitch in order to automatically adjust the clearance between the linings 23, 33 and the brake drum.

While in the event of the above-described automatic shoe clearance adjustment, if a high pressure is applied to the wheel cylinder, the bent portion 87 of the adjustment lever 80 is caught or clamped between the piston 51 and the end of the shoe web 21 of the brake shoe 20, thereby restricting the rotation of the adjustment lever 80 with the pin 14 as the fulcrum. Accordingly, automatic shoe clearance adjustment ceases and no excessive adjustment would result.

As is explained above, if a high pressure is applied, more specifically if the force generated by such pressure becomes larger than the spring force of the adjustment spring 13, the adjustment lever 80 only moves together with the brake shoe 20, thereby not sensing an elastic deformation of the brake shoes 20, 30 and the brake drum due to the pressure increase. Therefore, the clearance between the linings 23, 33 and the brake drum may be designed to be smaller than that of conventional designs in a normal condition without high pressure application.

Embodiment 2

Figure 5:
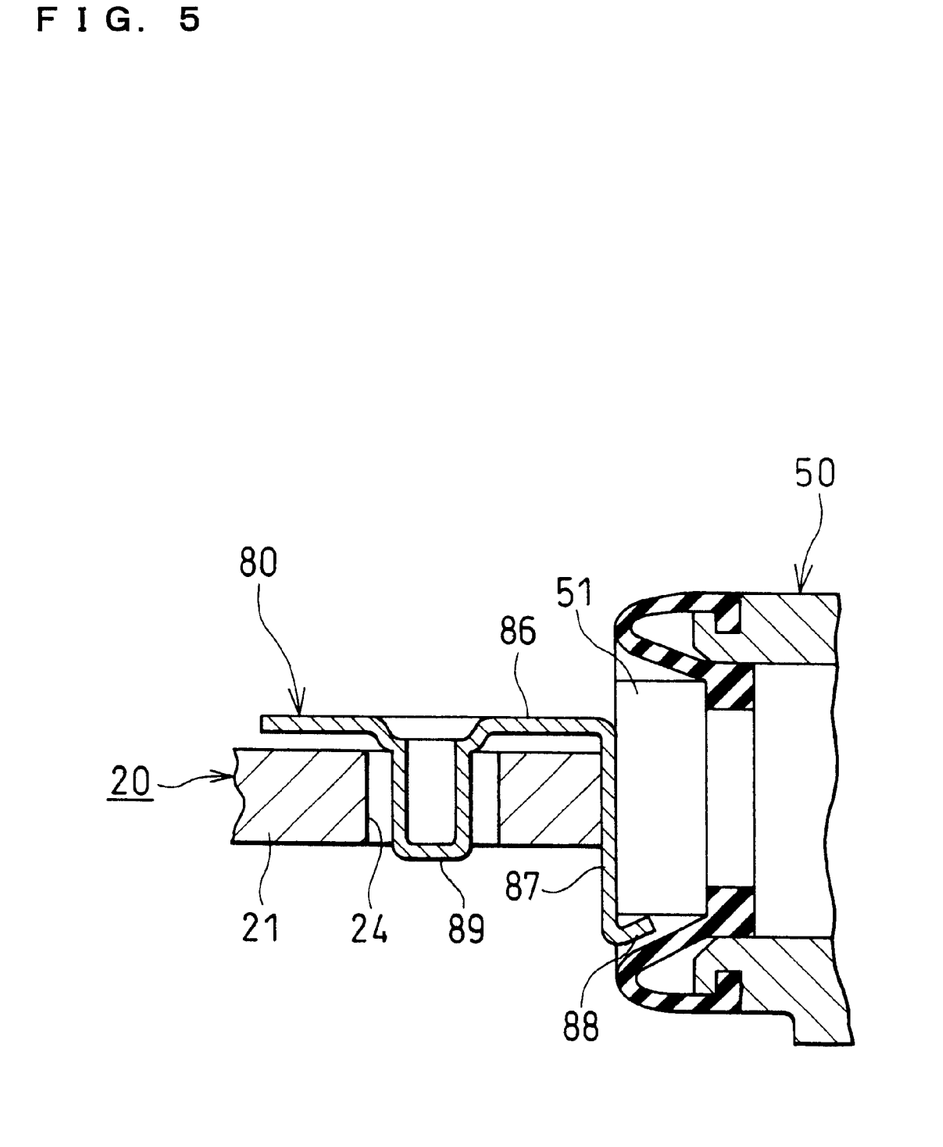
FIG. 5 is an explanation view of the pivot mechanism of the brake shoe and the adjustment lever according to Embodiment 2.

As shown in FIG. 5, a projection in the form of a protuberance 89 may be formed by deep drawing by pressing a portion of the adjustment lever 80, and the protuberance 89 may be fit into and pivotally supported by the long hole 24 which is formed in the shoe web 21 and extends in approximately the same direction in which the piston operates.

In addition, the combination of the projections in the form of a protuberance and the long hole at the pivot section may be interchanged, i.e. the protuberance can be provided on the shoe web while the long hole can be formed in the adjustment lever. In this embodiment, since the separate pin 14 as in the above Embodiment 1 can be omitted, the manufacturing is facilitated and the costs are reduced. Different forms of projections cooperating with different forms of holes are possible as long as the function of the embodiment described above is provided.

Embodiment 3

FIGS. 6–12 show another embodiment of an automatic shoe clearance adjustment device applied to a drum brake wherein a single brake shoe has a self-servo effect and functions as a leading shoe when a vehicle is either moving forward or backward.

For the explanation of this Embodiment, those components which are the same as in Embodiment 1 are identified with a 100-series of numbers with the same last two digits for which a detailed explanation is omitted here. Further, terms such as "right" and "left" or "upper" and "lower" may be used for the convenience of the explanation; however, the direction of the drum brake is not limited to what is illustrated in the figures.

Figure 6:
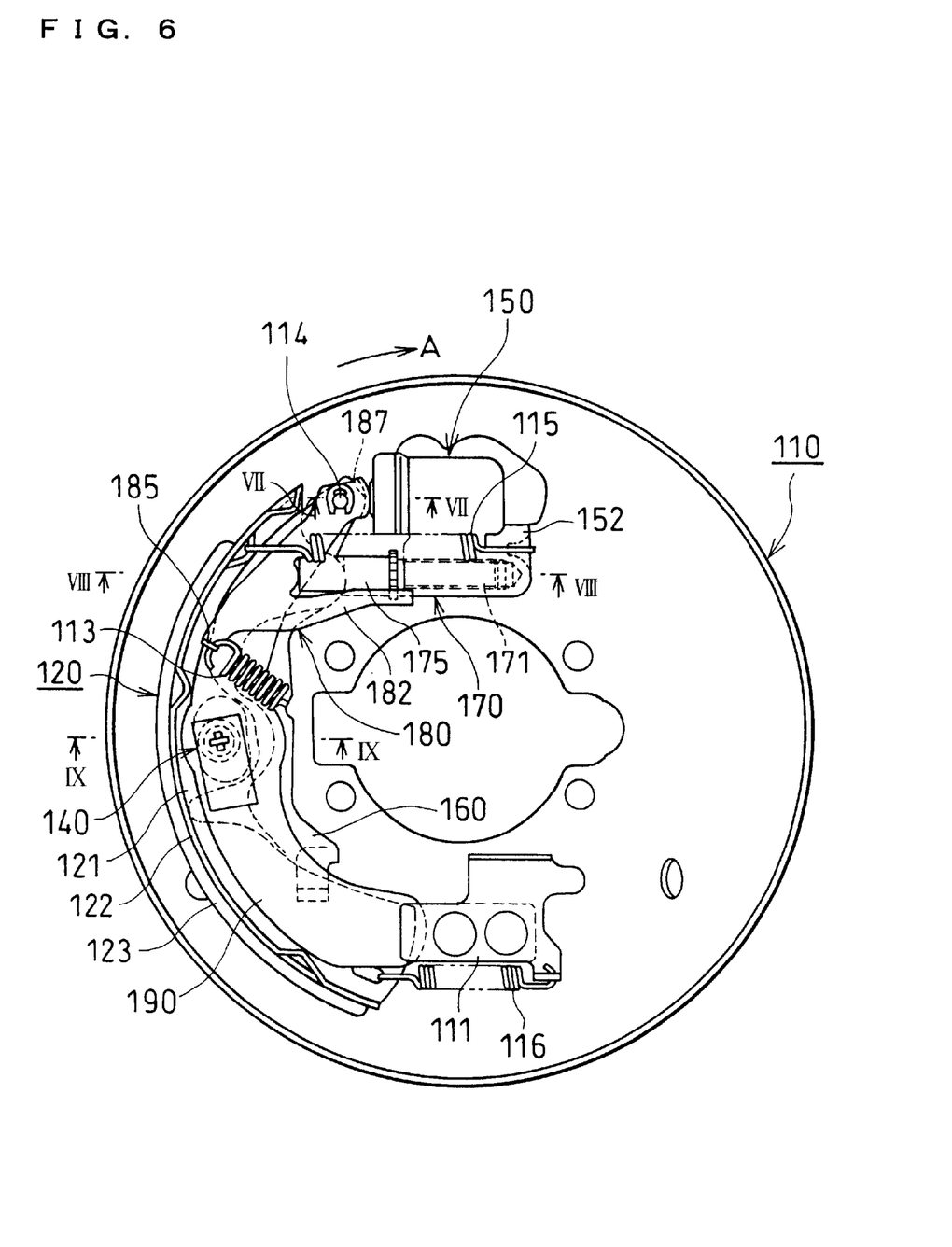
FIG. 6 is a plan view of the drum brake device equipped with the automatic shoe clearance adjustment device according to Embodiment 3.

A drum brake device explained in the Embodiment is different from the drum brake device explained in Embodiment 1 in that a brake shoe 120 is a single shoe; a wheel cylinder 150 is one-side operational type; and the brake shoe 120 opens via a link 190. That is, the lower end of the brake shoe 120 is supported by an anchor 111, and the upper end of the brake shoe 120 is supported by a strut 170 also functioning as an anchor.

Figure 7:
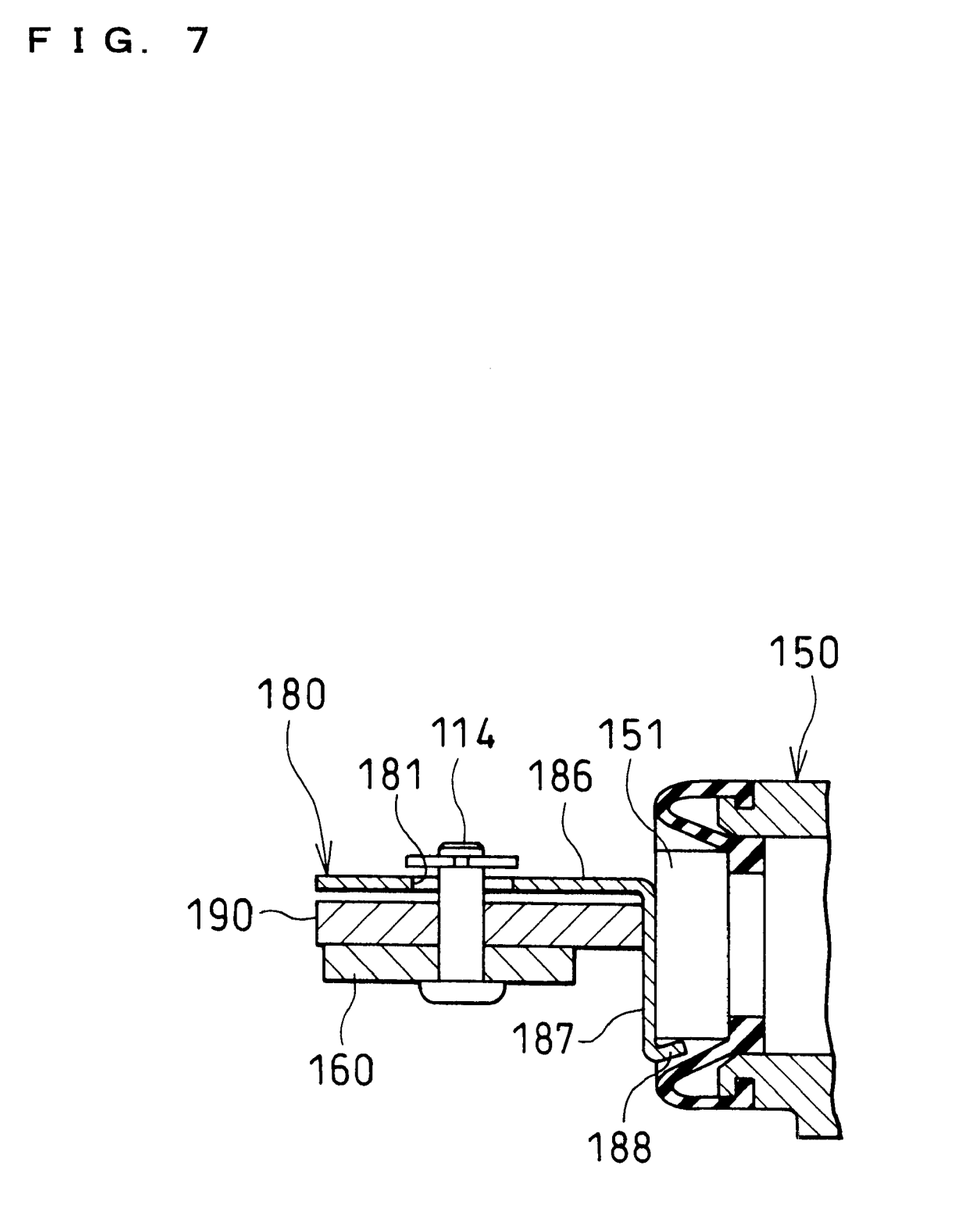
FIG. 7 is a cross-section view of FIG. 6 taken along the line VII—VII.

In FIGS. 6 and 7, a brake lever 160 is superimposed under a back plate 110 side of a shoe web 121 of the brake shoe 120. The link 190 is superimposed on the other side of the shoe web 121 and an adjustment lever 180 is superimposed on the link 190. The upper end of the brake lever 160, the link 190, and the adjustment lever 180 (all three members) are pivotally supported by a common pin 114.

Figure 8:
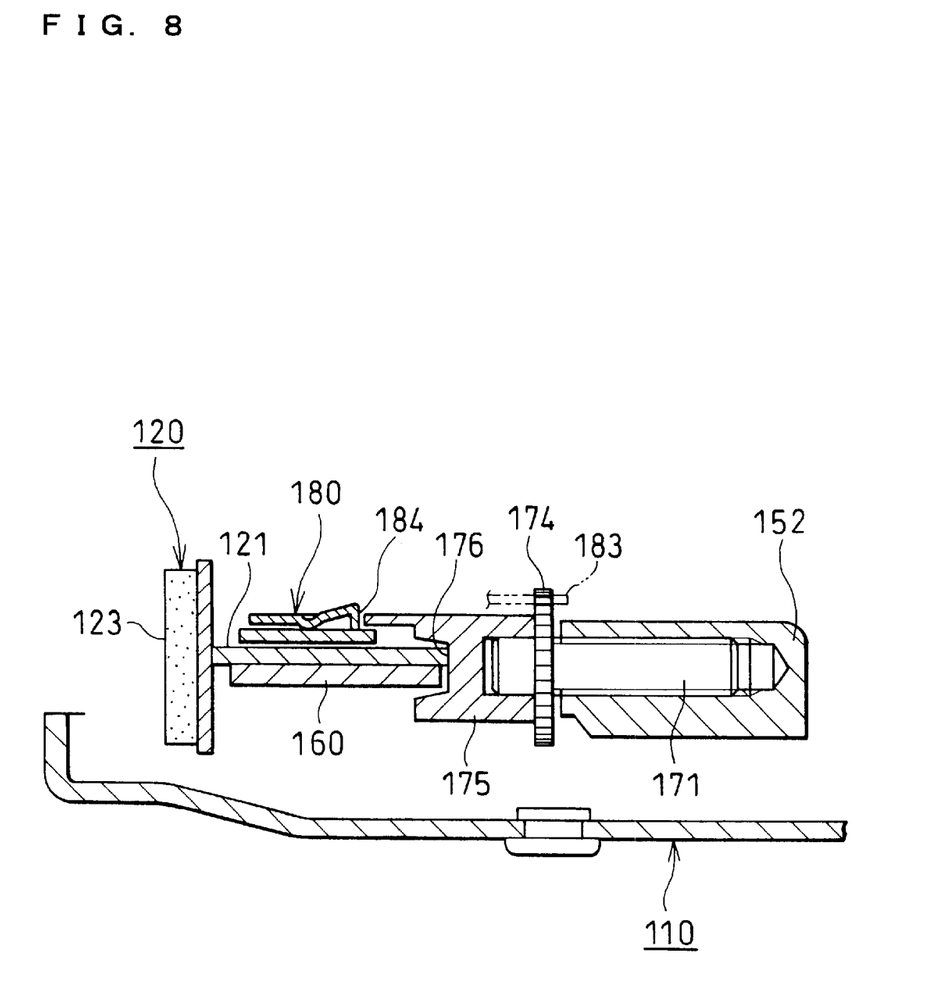
FIG. 8 is a cross-section view of FIG. 6 taken along the line VIII—VIII.

As shown in FIG. 8, the right side of a bolt 171 is screwed into a cylinder body 152, and the left side of the bolt 171 fits in a socket 175 so as to rotate relative to the socket 175. A notched groove 176 on the left side of the socket 175 receiving the central region of the shoe web 121 and the brake lever 160 prevents rotation of the socket 175, and the bottom of the groove at the notched groove supports the shoe web 121. In addition, in FIG. 8, adjustment teeth 174 are formed on a teethed adjustment wheel integrated with the bolt 171.

Figure 9:
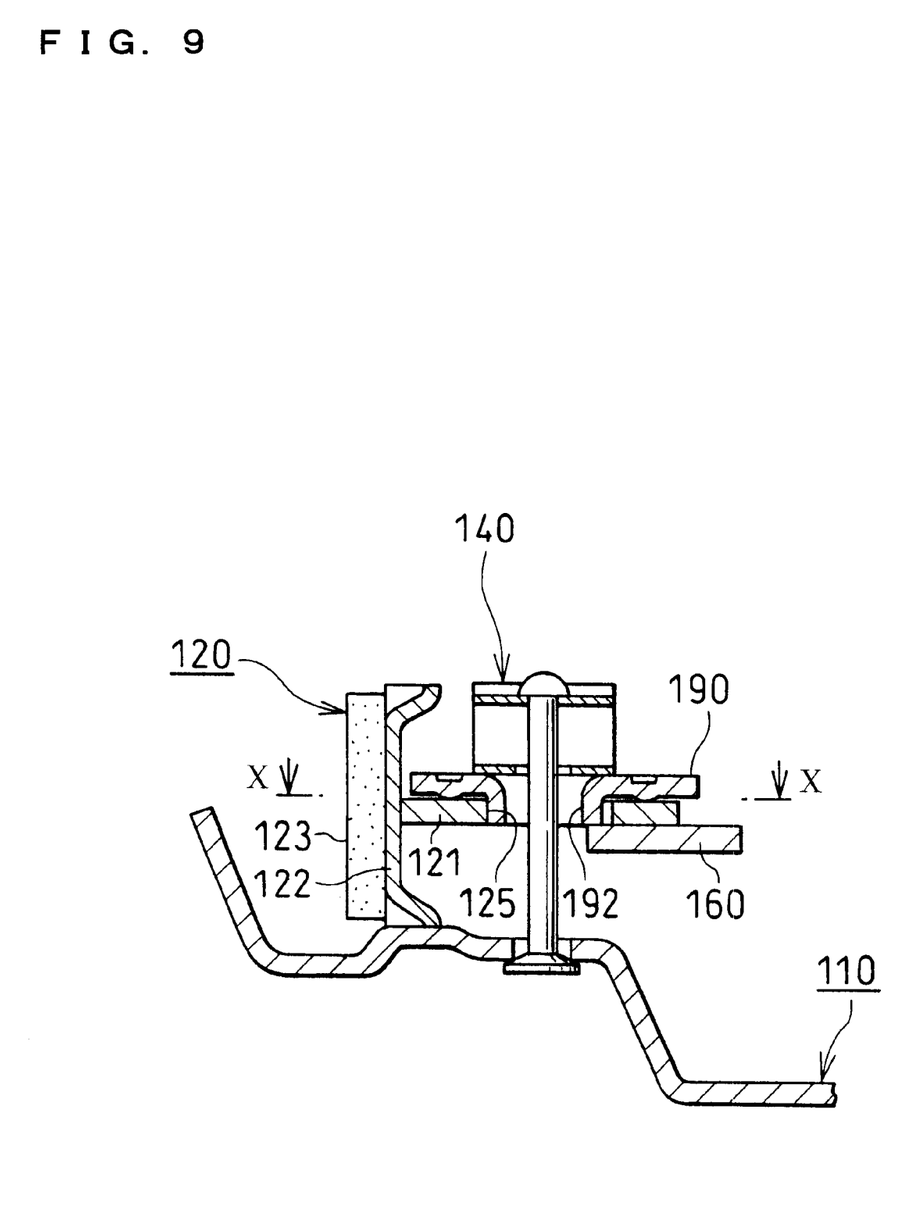
FIG. 9 is a cross-section view of FIG. 6 taken along the line IX—IX.
Figure 10:
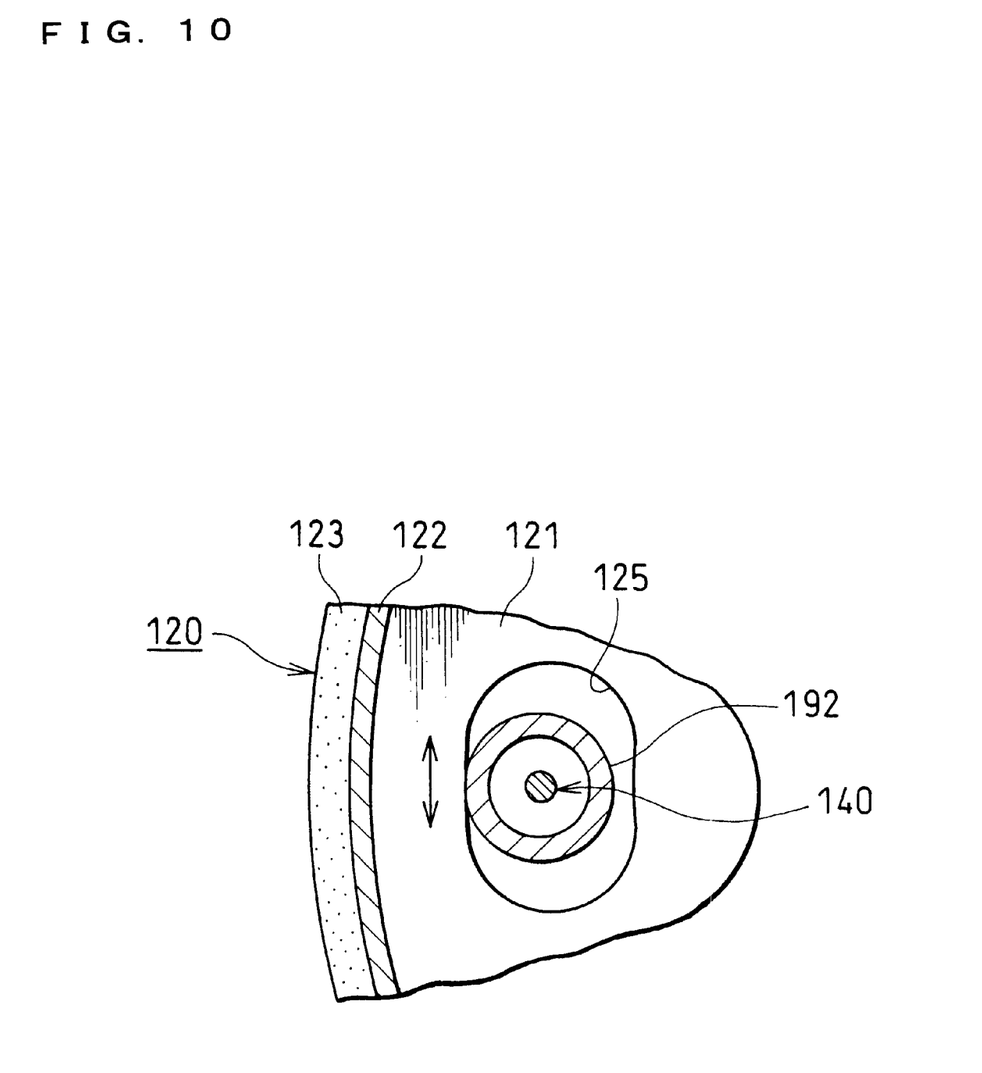
FIG. 10 is a cross-section view of FIG. 9 taken along the line X—X.

FIGS. 9 and 10 illustrate the pivot section of the link 190 and the brake shoe 120, wherein the protuberance 192 and the long hole 125, formed on the central region of the link 190 and the brake shoe 120, respectively, are both fit together; the brake shoe 120 is able to make a rotation relative to the link 190 and is to pivot with a capacity of making a relative movement in the circumferential direction of the brake drum. A shoe hold device 140 serves both as a shoe hold mechanism and as a supporting mechanism of this pivot section.

In addition, in this embodiment, the brake shoe 120 is a floating type anchor and the link 190 is a pivot type anchor. However, both may be designed to be a floating type anchor so that the pivot section of the brake shoe 120 and the link 190 may only be rotatable.

Figure 11:
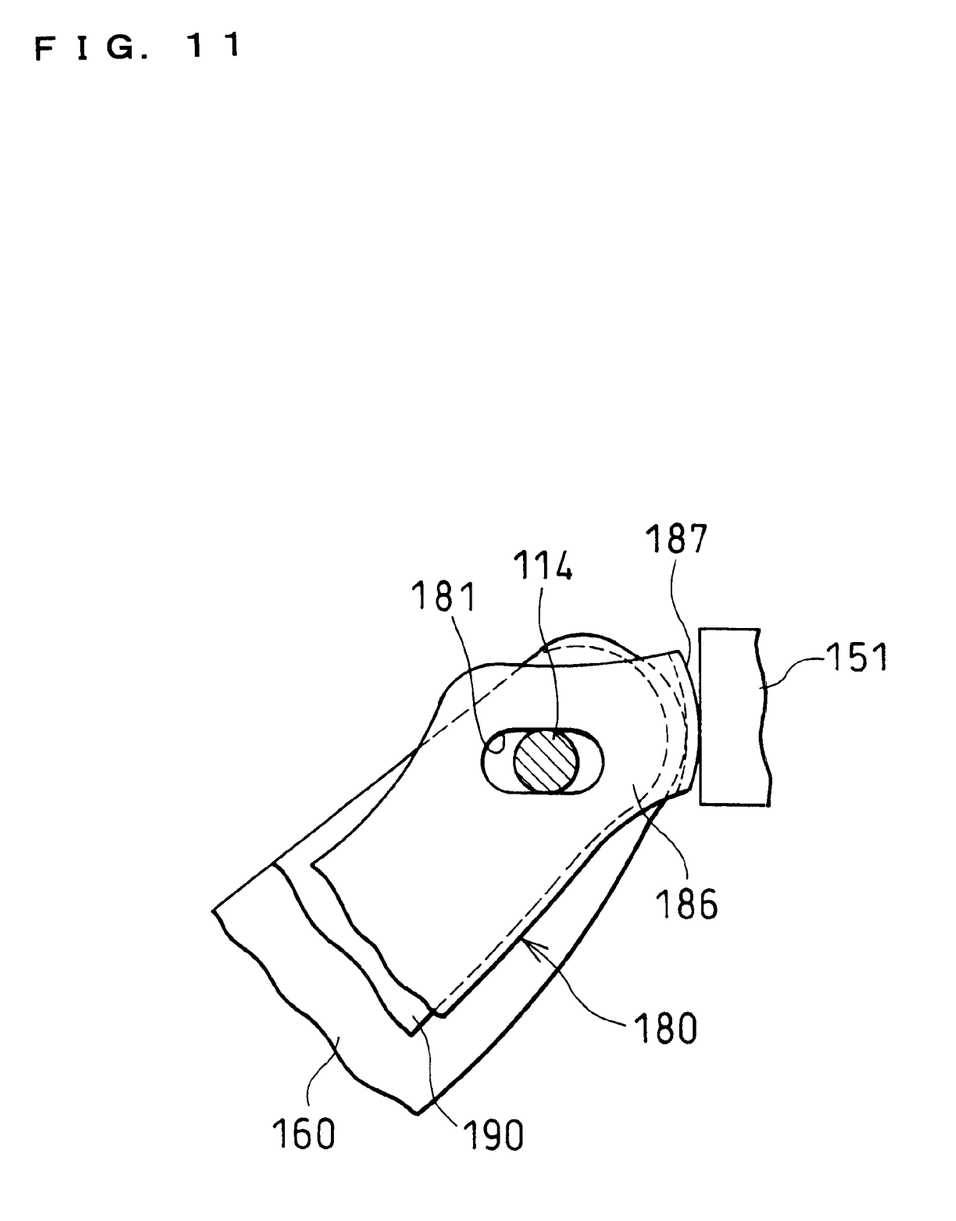
FIG. 11 is a partially enlarged view of the abutment section between the adjustment lever and the link.

FIG. 11 illustrates a simplified drawing of the engagement section of the upper end of the link 190 and the piston 151. The upper end of the link 190 functionally engages the piston 151 of the wheel cylinder 150 via a bent portion 187 of a third arm 186 which is an extended portion of the adjustment lever 180.

Figure 12:
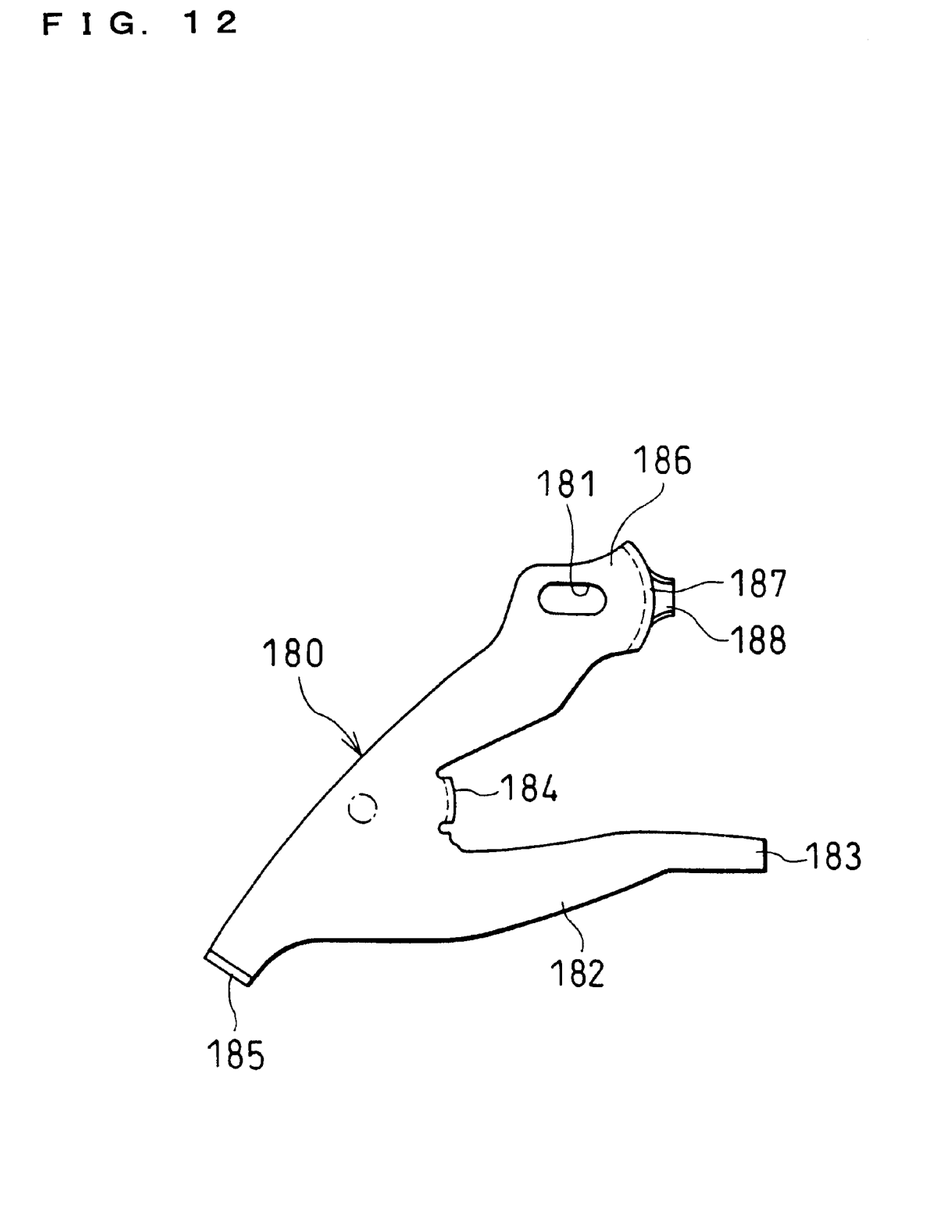
FIG. 12 is a plan view of the adjustment lever.

For this embodiment, the subject member with which the adjustment lever 180 is connected is changed from the brake shoe 120 to the link 190. That is, the adjustment lever 180 shown in FIG. 12 is used; a hole for pivoting the adjustment lever 180 is formed as a long hole 181 extending approximately in the same direction in which the piston 151 operates and the adjustment lever 180 is slidable as well as rotatable relative to the brake shoe 120 in approximately the same direction of service brake actuator operation and is supported by means of the pin 114 and the long hole 181.

This pivot structure does not make a gap between the link 190 and the extended portion of the adjustment lever 180, i.e., the bent portion 187 of the third arm 186. In addition, in FIGS. 6 and 12, the bent abutting end 184 abuts against the left end surface of the socket 175, and a hook portion 185 hooks an adjustment spring 113.

In this embodiment, at least a pin is provided on either one of the adjustment lever 180 or the link 190, and a long hole is formed on the other one in order for both to pivot.

In addition, in the drum brake device of this embodiment the moment acting on the link 190 by the shoe return springs 115, 116 with the pivot point with the link 190 affecting the brake shoe 120 as the fulcrum, is designed so that the rotation-exit side of the brake shoe 120 relative to the rotational direction A of the brake drum when moving forward is larger than the rotation-entry side of the brake shoe 120 and is designed so that the rotation-entry side of the bake shoe 120 always opens first.

Relative to the brake drum rotational direction A in moving forward, which is absolutely more frequent when driving a vehicle, the rotation-exit side of the brake shoe 120 is prevented from separating prior to the rotation-entry side, thereby eliminating the further impact load and impact noise.

Also, if the brake lever 160 is adjusted to rather be pulled, thereby generating a slight opening of the brake shoe 120, the rotation-exit side of the brake shoe 120 does not separate from the strut also functioning as an anchor, thereby eliminating the dragging phenomena.

In FIG. 6, while in either service brake operation or parking brake operation, when an actuating force of the wheel cylinder 150 or the brake lever 160 depresses the upper end of the link 190 and the brake shoe 120 engages and abuts against the brake drum, the brake shoe 120 independently slides in the circumferential direction of the brake drum relative to the link 190 and is supported by either one of the strut 170 or the anchor 111 to generate a braking force in moving forward or backward as a leading shoe.

A basic operation of preventing over-adjustment during automatic shoe clearance adjustment and high pressure application is the same as in Embodiment 1. Therefore, the explanation is omitted.

A conventional drum brake, wherein a single brake shoe operates as a leading shoe with a self-servo property when moving forward or backward, is not equipped with an over-adjustment preventing mechanism in the automatic shoe clearance adjustment device. Therefore, a clearance between the brake drum and the brake shoe in normal braking must be set larger to prevent over-adjustment at high pressure application, thereby giving an uncomfortable application feeling of brake pedal action or hand lever action to the user in a normal braking operation. The application of this invention to this single shoe type drum brake, will remove the above-identified problems.

Embodiment 4

In another embodiment, this invention can be, for example, applied to a single brake shoe type drum brake device disclosed in U.S. Pat. No. 5,819,887 which is incorporated herein by reference.

As is evident from the aforementioned configurations, this invention provides the following advantages:

The adjustment lever is pivotally supported with a capacity of making a relative rotation relative to the brake shoe or the link and making a relative slide in the direction approximately the same as the operational direction of a service brake actuator, thereby constantly abutting the extended portion of the adjustment lever against the end surface of the shoe or the link without a gap, regardless of the effects of uneven manufacturing tolerances.

Eliminating the gap helps to improve the durability of the adjustment lever and to provide a reliable shoe clearance as well as to provide a long term assurance against over-adjustment of the shoe clearance.

This invention can be widely used for a general purpose in that it is applicable to various types of drum brake devices, such equipped with a single brake shoe and a single link and such equipped with a pair of brake shoes.

As a means to slide the adjustment lever in the operational direction of the service brake actuator, this invention only requires a long hole on either the adjustment lever or the brake shoe or the link in the vicinity of the pivot portion. This facilitates the manufacturing.

A top end of the bent portion of the adjustment lever is bent with an acute angle. Such a bent hook is arranged to face the peripheral surface of the service brake actuator piston at the back plate side. With such structure this invention also becomes capable of functioning as a mechanism for preventing the brake shoe from lifting.

It is readily apparent that the above-described has the advantage of wide commercial utility. It should be understood that the specific form of the invention hereinabove described is intended to be representative only, as certain modifications within the scope of the claims will be apparent to those skilled in the art.

What I claim is:

1. An automatic shoe clearance adjustment device for a drum brake, comprising:

a pair of brake shoes slidably mounted on a back plate;

an extendible strut restricting an initial position of said pair of brake shoes; and an adjustment lever pivotally supported at one of said brake shoes, said adjustment lever being rotatable in response to an excessive opening of said brake shoes upon operation of a service brake actuator and said adjustment lever having an extended portion integrally formed as an extended end thereof, said extended portion being arranged between abutment surfaces of said service brake actuator and one of said brake shoes at an actuating force transmitting section through which an actuating force of said service brake actuator is transmitted to said one of the brake shoes, and said adjustment lever being adapted to stop rotating when said actuating force of said service brake actuator reaches a predetermined value;

wherein said adjustment lever is pivotally supported with a capacity of making a rotation relative to said one of the brake shoes and a capacity of making a relative slide in approximately the same direction in which said service brake actuator operates so as to maintain a contact between said extended portion and said one of the brake shoes.

2. An automatic shoe clearance adjustment device as claimed in claim 1, wherein:

a projection is formed either on the adjustment lever or on said one of the brake shoes and said projection is pivotally supported at a long hole formed either on the other one of said adjustment lever or said one of the brake shoes on which said projection is not formed.

3. An automatic shoe clearance adjustment device as claimed in claim 2, wherein:

said projection is a protuberance integrally formed with said adjustment lever or said one of the brake shoes by deep drawing by pressing.

4. An automatic shoe clearance adjustment device as claimed in claim 3, wherein:

both abutment surfaces of said extended portion of said adjustment lever and said brake shoe or said link are formed in a circular shape; and a radius of curvature of said abutment surface of said adjustment lever is set to be larger than that of said abutment surface of said brake shoe or said link.

5. An automatic shoe clearance adjustment device as claimed in claim 3, wherein:
   an end portion of said extended portion of adjustment lever is bent outward; and
   said bent portion is arranged to face the peripheral surface of a service brake actuator piston at the back plate side.

6. An automatic shoe clearance adjustment device as claimed in claim 3, wherein:
   both abutment surfaces of said extended portion of said adjustment lever and said brake shoe or said link are formed in a circular shape;
   a radius of curvature of said abutment surface of said adjustment lever is set to be larger than that of said abutment surface of said brake shoe or said link;
   an end portion of said extended portion of adjustment lever is bent outward; and
   said bent portion is arranged to face the peripheral surface of a service brake actuator piston at the back plate side.

7. An automatic shoe clearance adjustment device as claimed in claim 2, wherein:
   both abutment surfaces of said extended portion of said adjustment lever and said brake shoe or said link are formed in a circular shape; and
   a radius of curvature of said abutment surface of said adjustment lever is set to be larger than that of said abutment surface of said brake shoe or said link.

8. An automatic shoe clearance adjustment device as claimed in claim 2, wherein:
   an end portion of said extended portion of adjustment lever is bent outward; and
   said bent portion is arranged to face the peripheral surface of a service brake actuator piston at the back plate side.

9. An automatic shoe clearance adjustment device as claimed in claim 2, wherein:
   both abutment surfaces of said extended portion of said adjustment lever and said brake shoe or said link are formed in a circular shape;
   a radius of curvature of said abutment surface of said adjustment lever is said to be larger than that of said abutment surface of said brake shoe or said link;
   an end portion of said extended portion of adjustment lever is bent outward; and
   said bent portion is arranged to face the peripheral surface of a service brake actuator piston at the back plate side.

10. An automatic shoe clearance adjustment device as claimed in claim 1, wherein:
    both abutment surfaces of said extended portion of said adjustment lever and said brake shoe or said link are formed in a circular shape; and
    a radius of curvature of said abutment surface of said adjustment lever is set to be larger than that of said abutment surface of said brake shoe or said link.

11. An automatic shoe clearance adjustment device as claimed in claim 1, wherein:
    an end portion of said extended portion of adjustment lever is bent outward, and
    said bent portion is arranged to face the peripheral surface of a service brake actuator piston at the back plate side.

12. An automatic shoe clearance adjustment device as claimed in claim 1, wherein:
    both abutment surfaces of said extended portion of said adjustment lever and said brake shoe or said link are formed in a circular shape;
    a radius of curvature of said abutment surface of said adjustment lever is set to be larger than that of said abutment surface of said brake shoe or said link;
    an end portion of said extended portion of adjustment lever is bent outward; and
    said bent portion is arranged to face the peripheral surface of a service brake actuator piston at the back plate side.

13. The automatic shoe clearance device according to claim 1, wherein said extended portion of said adjustment lever includes a bent portion directly disposed between an end part of a piston of said service brake actuator and an end part of a shoe web of said one of the brake shoes whereby said bent portion is maintained in abutment with said shoe web.

14. An automatic shoe clearance adjustment device for a drum brake, comprising:
    a single brake shoe slidably mounted on a back plate;
    an extendible strut restricting an initial position of said brake shoe;
    a link engaging with said brake shoe so as to depress a central region of said brake shoe; and
    an adjustment lever pivotally supported at said link, said adjustment lever being rotatable in response to an excessive opening of said link upon operation of a service brake actuator and said adjustment lever having an extended portion integrally formed as an extended end thereof, said extended portion being arranged between abutment surfaces of said service brake actuator and said link at an actuating force transmitting section through which an actuating force of said service brake actuator is transmitted to said link, and said adjustment lever being adapted to stop rotating when said actuating force of said service brake actuator reaches a predetermined value;
    wherein said adjustment lever is pivotally supported with a capacity of making a rotation relative to said link and a capacity of making a relative slide in approximately the same direction in which said service brake actuator operates so as to maintain a contact between said extended portion and said link.

15. An automatic shoe clearance adjustment device as claimed in claim 14, wherein:
    a projection is formed either on said adjustment lever or on said link and said projection is pivotally supported at a long hole formed either on said adjustment lever or said link on which said projection is not formed.

16. An automatic shoe clearance adjustment device as claimed in claim 15, wherein:
    said projection is a protuberance integrally formed with said adjustment lever or said link by deep drawing by pressing.

17. An automatic shoe clearance adjustment device as claimed in claim 16, wherein:
    both abutment surfaces of said extended portion of said adjustment lever and said brake shoe or said link are formed in a circular shape; and
    a radius of curvature of said abutment surface of said adjustment lever is set to be larger than that of said abutment surface of said brake shoe or said link.

18. An automatic shoe clearance adjustment device as claimed in claim 16, wherein:
    an end portion of said extended portion of adjustment lever is bent outward; and
    said bent portion is arranged to face the peripheral surface of a service brake actuator piston at the back plate side.

19. An automatic shoe clearance adjustment device as claimed in claim 16, wherein:
    both abutment surfaces of said extended portion of said adjustment lever and said brake shoe or said link are formed in a circular shape;

a radius of curvature of said abutment surface of said adjustment lever is set to be larger than that of said abutment surface of said brake shoe or said link;

an end portion of said extended portion of adjustment lever is bent outward; and said bent portion is arranged to face the peripheral surface of a service brake actuator piston at the back plate side.

20. An automatic shoe clearance adjustment device as claimed in claim 15, wherein:

both abutment surfaces of said extended portion of said adjustment lever and said brake shoe or said link are formed in a circular shape; and a radius of curvature of said abutment surface of said adjustment lever is set to be larger than that of said abutment surface of said brake shoe or said link.

21. An automatic shoe clearance adjustment device as claimed in claim 15, wherein:

an end portion of said extended portion of adjustment lever is bent outward; and said bent portion is arranged to face the peripheral surface of a service brake actuator piston at the back plate side.

22. An automatic shoe clearance adjustment device as claimed in claim 15, wherein:

both abutment surfaces of said extended portion of said adjustment lever and said brake shoe or said link are formed in a circular shape;

a radius of curvature of said abutment surface of said adjustment lever is set to be larger than that of said abutment surface of said brake shoe or said link;

an end portion of said extended portion of adjustment lever is bent outward; and said bent portion is arranged to face the peripheral surface of a service brake actuator piston at the back plate side.

23. An automatic shoe clearance adjustment device as claimed in claim 14, wherein:

both abutment surfaces of said extended portion of said adjustment lever and said brake shoe or said link are formed in a circular shape; and a radius of curvature of said abutment surface of said adjustment lever is set to be larger than that of said abutment surface of said brake shoe or said link.

24. An automatic shoe clearance adjustment device as claimed in claim 14, wherein:

an end portion of said extended portion of adjustment lever is bent outward; and said bent portion is arranged to face the peripheral surface of a service brake actuator piston at the back plate side.

25. An automatic shoe clearance adjustment device as claimed in claim 14, wherein:

both abutment surfaces of said extended portion of said adjustment lever and said brake shoe or said link are formed in a circular shape;

a radius of curvature of said abutment surface of said adjustment lever is set to be larger than that of said abutment surface of said brake shoe or said link;

an end portion of said extended portion of adjustment lever is bent outward; and said bent portion is arranged to face the peripheral surface of a service brake actuator piston at the back plate side.

26. The automatic shoe clearance device according to claim 14, wherein said extended portion of said adjustment lever includes a bent portion directly disposed between an end part of a piston of said service brake actuator and an end part of said link whereby said bent portion is maintained in abutment with said link.

27. An automatic shoe clearance adjustment device for a drum brake comprising:

an extendible strut restricting an initial position of at least one brake shoe relative to a back plate;

an adjustment lever pivotally supported at one end of a reaction member moves in response to an actuating force of a service brake actuator, said adjustment lever being rotatable in response to an excessive displacement of said at least one brake shoe upon operation of a service brake actuator, said adjustment lever having an integrally formed extended portion having a force transmitting section disposed between abutment surfaces of said reaction member and said service brake actuator to facilitate transmission of an actuator force of said at least one brake shoe, said adjustment lever being adapted to stop rotating when said actuator force reaches a predetermined value;

wherein said adjustment lever is pivotally supported with a capacity of making a rotation relative to said reaction member and a capacity of making a relative slide substantially parallel to a direction in which said service brake actuator operates so as to maintain a contact between said extended portion and said one of the brake shoes.

* * * * *